(12) United States Patent
Blossfeld et al.

(10) Patent No.: US 7,454,965 B2
(45) Date of Patent: Nov. 25, 2008

(54) METHOD AND APPARATUS FOR MOUNTING A TIRE PRESSURE MONITORING DEVICE

(75) Inventors: Mike Blossfeld, South Lyon, MI (US); David L. Juzswik, Commerce Township, MI (US); John Scales, Ann Arbor, MI (US)

(73) Assignees: TRW Automotive U.S. LLC, Farmington Hills, MI (US); Societe de Technologie Michelin, Clermont-Ferrand (FR)

( * ) Notice: Subject to any disclaimer, the term of this patent is extended or adjusted under 35 U.S.C. 154(b) by 0 days.

(21) Appl. No.: 11/521,875

(22) Filed: Sep. 15, 2006

(65) Prior Publication Data
US 2007/0062268 A1    Mar. 22, 2007

Related U.S. Application Data

(60) Provisional application No. 60/718,465, filed on Sep. 19, 2005.

(51) Int. Cl.
*B60C 23/02*    (2006.01)
(52) U.S. Cl. .......................... 73/146; 73/146.8
(58) Field of Classification Search ........ 73/146–146.8; 340/442–447
See application file for complete search history.

(56) References Cited

U.S. PATENT DOCUMENTS

| | | | | |
|---|---|---|---|---|
| 6,055,855 | A * | 5/2000 | Straub | 73/146.8 |
| 6,163,255 | A | 12/2000 | Banzhof et al. | |
| 6,568,259 | B2 | 5/2003 | Saheki et al. | |
| 6,655,203 | B2 * | 12/2003 | Hsu | 73/146.8 |
| 6,722,409 | B1 | 4/2004 | Martin | |
| 6,799,455 | B1 | 10/2004 | Neefeldt et al. | |
| 6,862,929 | B2 * | 3/2005 | Luce | 73/146.8 |
| 6,912,897 | B2 * | 7/2005 | Luce | 73/146.8 |
| 6,945,104 | B2 * | 9/2005 | Uleski | 73/146.8 |
| 6,952,957 | B2 * | 10/2005 | Kayukawa | 73/146.8 |
| 6,959,597 | B2 * | 11/2005 | Ito et al. | 73/146.8 |
| 7,040,155 | B1 * | 5/2006 | Lundell et al. | 73/146.8 |

\* cited by examiner

*Primary Examiner*—Andre J. Allen
*Assistant Examiner*—Jermaine Jenkins
(74) *Attorney, Agent, or Firm*—Tarolli, Sundheim, Covell & Tummino LLP

(57) ABSTRACT

A tire pressure mounting apparatus is provided including a pressure sensor for sensing the pressure in a tire. The pressure sensor has a housing. A threaded fastener is secured to the housing and forms a first valve portion. A tire valve stem projects through a first opening in a rim for holding the tire. The tire valve stem carries a second valve portion therein. The first valve portion and the second valve portion form a valve when screwed together.

5 Claims, 2 Drawing Sheets

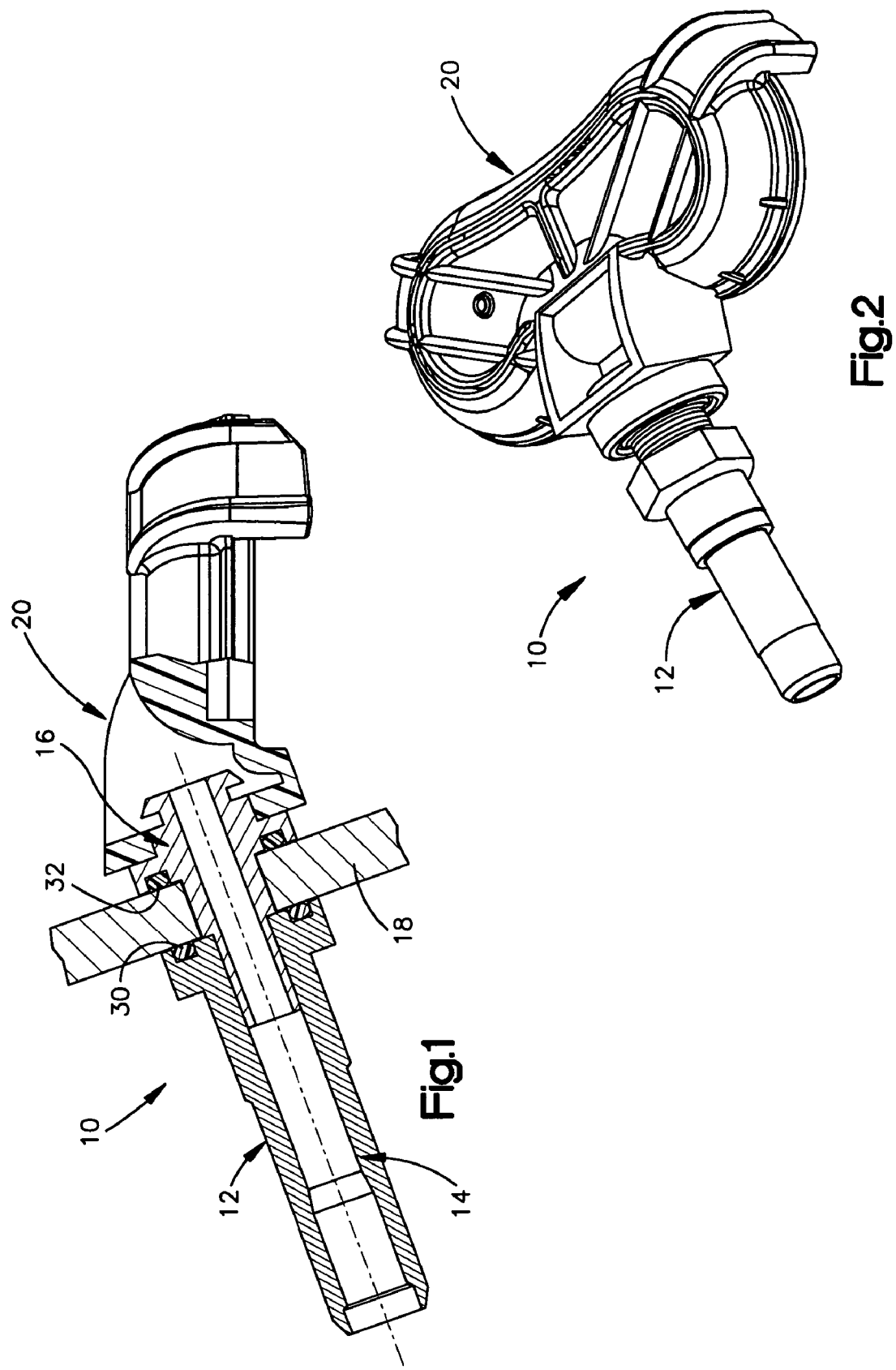

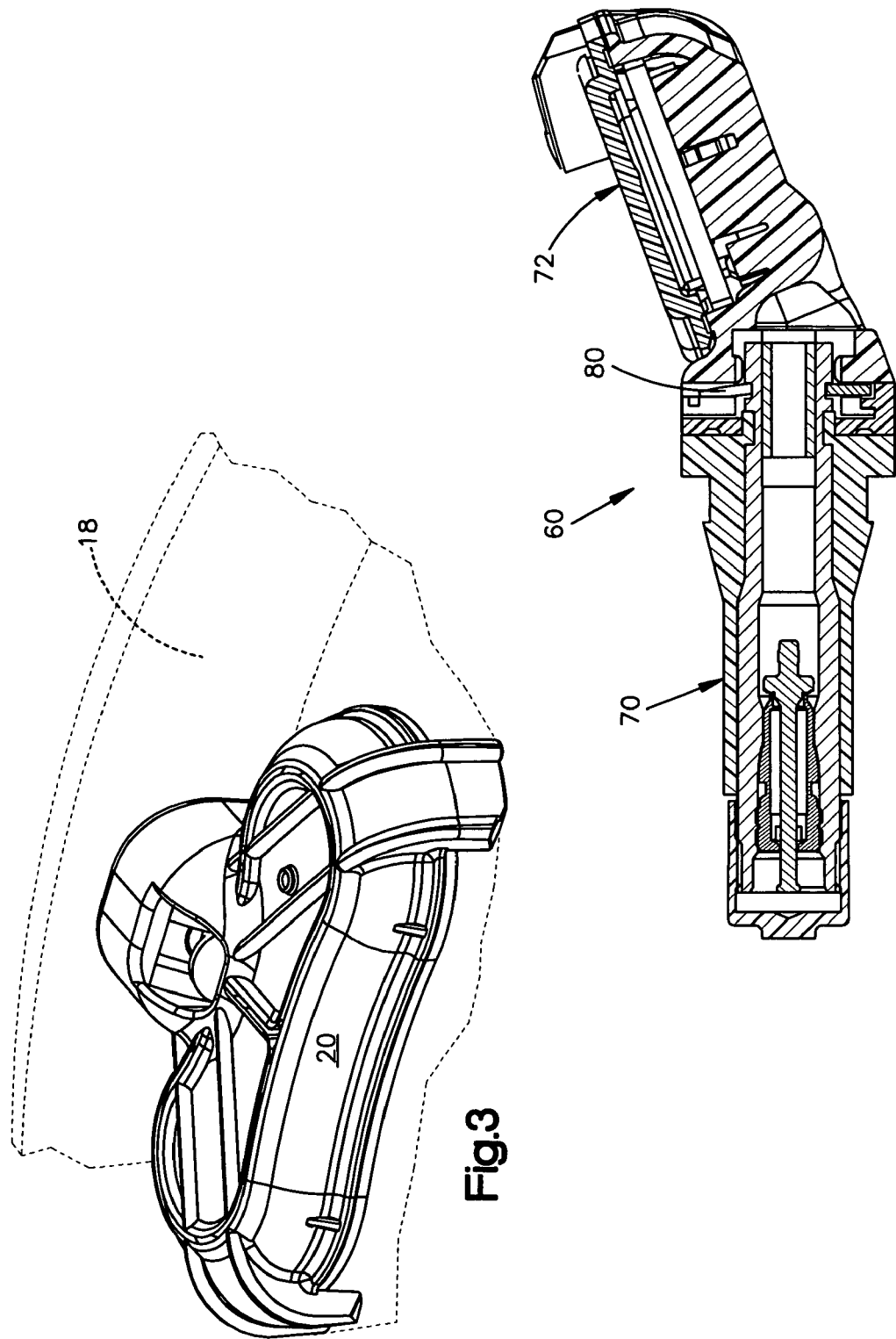

METHOD AND APPARATUS FOR MOUNTING A TIRE PRESSURE MONITORING DEVICE

RELATED APPLICATION

This application claims priority from U.S. provisional patent application Ser. No. 60/718,465, filed on Sep. 19, 2005, the subject matter of which is incorporated herein by reference.

TECHNICAL FIELD

The present invention is directed to a tire pressure monitoring device and is particularly directed to a method and apparatus for mounting a tire pressure monitoring device to a vehicle wheel.

BACKGROUND OF THE INVENTION

Tire pressure monitoring systems ("TPMS") are known in the art. There have been several mounting arrangements proposed for these TPMS.

U.S. Pat. Nos. 6,163,255, 6,722,409, 6,568,259, and 6,799,455 show various mounting arrangements.

SUMMARY OF THE INVENTION

In accordance with the present invention, a tire pressure monitoring system is provided that optimizes material cost, flexibility, reliability, and sealing.

In accordance with one exemplary embodiment of the present invention, a tire pressure mounting apparatus is provided including a pressure sensor for sensing the pressure in a tire. The pressure sensor has a housing. A threaded fastener is secured to the housing and forms a first valve portion. A tire valve stem projects through a first opening in a rim for holding the tire. The tire valve stem carries a second valve portion therein. The first valve portion and the second valve portion form a valve when screwed together.

In accordance with another exemplary embodiment of the present invention, a tire pressure mounting apparatus comprises a pressure sensor for sensing the pressure in a tire. The pressure sensor has a housing. A rubber tire valve stem is provided for projecting through a first opening in a rim for holding the tire and forming an air tight seal. The tire valve stem includes a receiving portion for receiving the housing on said stem. The apparatus further comprises a clip for securing the valve stem and the housing together.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 1 is a cross sectional view of a tire pressure monitoring system showing a mounting arrangement in accordance with an exemplary embodiment of the present invention;

FIG. 2 is a perspective view of the tire pressure monitoring system shown in FIG. 1;

FIG. 3 is a perspective view of the tire pressure monitoring system of FIG. 1 mounted to a tire rim; and FIG. 4 is a cross sectional view of a tire pressure monitoring system showing a mounting arrangement in accordance with another exemplary embodiment of the present invention.

DESCRIPTION OF PREFERRED EMBODIMENT

Referring to FIG. 1, a tire pressure monitoring device 10 includes a valve 12 having a two piece assembly 14, 16 that allows for low cost manufacturing. All valve parts are, in accordance with an exemplary embodiment, manufactured with low cost brass that provides a rigid secure mount while maintaining a secure seal. The first part 14 of the valve assembly uses the valve body (stem with internal valve) as a nut (as opposed to a screw with an external nut). Thus, there is no external nut to corrode to the valve body threads (only one expose part). The body can be assembled with the valve core independently of any housing. Manufacturing costs are reduce due to the use of brass.

A second portion 16 of the tire pressure monitoring device 10, located on the inside portion of a rim 18 when mounted, acts as a screw to the outer valve body (first portion). The second portion 16 of the tire pressure monitoring device 10 is lock into the sensor plastic housing 20, not allowing rotation of the second portion 16 about the sensor housing 20 shown in U.S. Pat. No. 6,055,855, which is hereby fully incorporated herein by reference. In accordance with an exemplary embodiment, the second portion 16 is wedge-shaped, to allow assembly to various shaped rims, and associated drop well angles, without changing the sensor housing or the external first valve portion 14. It is also contemplated, in accordance with another exemplary embodiment of the present invention, to change the location of the screw shaft to allow for different hole locations in the rim. This has inventory and aftermarket flexibility advantages.

It should be appreciated that the first portion 14 and second portion 16 functions as the screw and nut may be swapped and still maintain the same advantages.

O-ring seals 30, 32 prevent air leaks from the wheel. In accordance with one exemplary embodiment, the first valve portion 14 and the second valve portion 16 would have o-ring undercuts such that the o-rings would not fall out during shipping or assembly.

Referring to FIG. 4, a tire pressure monitoring device 60 includes an over-molded rubber valve 70, that clipped to the generic sensor housing 72 using a C-clip or E-clip 80, which has part of its rubber over-mold acting as a grommet. Mounting is done by pulling the valve through the tire valve mounting hole. This arrangement allows for the use of either a low G rubber valve or a high G brass valve, with the same housing body. The valve 70 is attached to the sensor housing 72 using a standard fastener (C-clip or E-clip 80). Thus, a manufacturer could have one sensor housing 72 stock number and interchange rubber and brass valves depending on the vehicle requirements.

From the above description of the invention, those skilled in the art will perceive improvements, changes and modifications. In addition to pressure sensing, one skilled in the art will appreciate other parameters may be sensed such as temperature, etc. Such improvements, changes and modifications within the skill of the art are intended to be covered by the appended claims.

Having described the invention, the following is claimed:

1. A tire pressure monitoring device mounting apparatus comprising:

a pressure sensor for sensing the pressure in a tire, said pressure sensor having a housing;

a first valve portion comprising a valve stem and a first threaded fastening portion; and a second valve portion connected to said housing, said second valve portion comprising a second threaded fastening portion for projecting through an opening in a rim for holding the tire, the first threaded fastening portion being engageable with the second threaded fastening portion to screw together the first and second valve portions and thereby secure the pressure sensor to the rim, said first valve portion and second valve portion when screwed together forming a valve.

2. The tire pressure monitoring device mounting apparatus of claim 1 further comprising an O-ring coupled to said first valve portion for forming an air-tight seal against the rim when said first and second valve portions are screwed together.

3. A tire pressure monitoring device mounting method comprising the steps of:
- mounting a pressure sensor for sensing the pressure in a tire in a housing;
- providing a first valve portion comprising a valve stem and a first threaded fastening portion;
- connecting a second valve portion to the housing, the second valve portion comprising a second threaded fastening portion;
- projecting the second threaded fastening portion through an opening in a rim for holding the tire; and
- screwing the first valve portion and the second valve portion together to form a valve.

4. The tire pressure monitoring device mounting apparatus of claim 1 further comprising a first O-ring coupled to said first valve portion and a second O-ring coupled to said second valve portion for forming an air-tight seal against the rim when said first and second valve portions are screwed together.

5. A tire pressure monitoring device mounting apparatus comprising:
- a pressure sensor for sensing the pressure in a tire, said pressure sensor having a housing;
- a first valve portion comprising a valve stem and an internally threaded portion; and
- a second valve portion connected to said housing, said second valve portion having an externally threaded portion for projecting through an opening in a rim for holding the tire, the internally threaded portion being engageable with the externally threaded portion to screw together the first and second valve portions and thereby secure the pressure sensor to the rim, said first valve portion and second valve portion when screwed together forming a valve.

* * * * *